United States Patent
Bartholomeusz et al.

(10) Patent No.: US 6,398,880 B1
(45) Date of Patent: Jun. 4, 2002

(54) MAGNETIC DATA-STORAGE TARGETS AND METHODS FOR PREPARATION

(75) Inventors: Michael Bartholomeusz, Phoenix; Carlos Chappa, Phx, both of AZ (US)

(73) Assignee: Heraeus, Inc., Chandler, AZ (US)

( * ) Notice: Subject to any disclaimer, the term of this patent is extended or adjusted under 35 U.S.C. 154(b) by 0 days.

(21) Appl. No.: 08/908,789

(22) Filed: Aug. 8, 1997

Related U.S. Application Data

(60) Provisional application No. 60/031,983, filed on Nov. 29, 1996.

(51) Int. Cl.⁷ .............................................. H01F 1/047
(52) U.S. Cl. ...................... 148/313; 148/425; 420/435; 420/436
(58) Field of Search ................................ 148/313, 425; 420/435, 436, 440

(56) References Cited

U.S. PATENT DOCUMENTS

| | | | |
|---|---|---|---|
| 4,557,769 A | * 12/1985 | Shimada et al. ............ | 148/313 |
| 4,904,290 A | * 2/1990 | Gaul et al. ........................ | 65/1 |
| 5,282,946 A | * 2/1994 | Kinoshita et al. ...... | 204/298.13 |
| 5,631,094 A | * 5/1997 | Ranjan et al. ............... | 428/611 |
| 5,728,279 A | * 3/1998 | Schlott et al. ......... | 204/298.13 |

FOREIGN PATENT DOCUMENTS

| | | | |
|---|---|---|---|
| JP | 4-134719 | * | 5/1992 |
| JP | 5-295537 | * | 11/1993 |

* cited by examiner

*Primary Examiner*—John Sheehan
(74) *Attorney, Agent, or Firm*—McDermott, Will & Emery

(57) ABSTRACT

Cobalt-based Ta-containing magnetic target alloy materials are produced in which homogeneity of the magnetic material is improved by eliminating Ta-rich second phases in the microstructure by a process comprising soaking ingots of said alloy from which targets are to be produced at temperatures ranging from 1600° to 2600° F. for periods of 10 minutes to 24 hours prior to hot-rolling, preferably using multiple steps, then hot-rolling at similar temperatures utilizing at least a 3% reduction for pass, and optionally soaking the rolled plates from said rolling step at temperatures ranging from 2000° to 2600° F. for periods of 10 minutes to 24 hours.

19 Claims, 20 Drawing Sheets

MAGNETIC DATA-STORAGE TARGETS AND METHODS FOR PREPARATION

CROSS-REFERENCE TO RELATED APPLICATION

This application claims the benefit of the filing date of Provisional Patent Application Ser. No. 60/031,983, filed Nov. 29, 1996.

FIELD OF THE INVENTION

This invention relates to $Co_f$—$Cr_a$—$Ni_g$—$Pt_b$—$B_c$—$(Si, Zr, Fe, W, Mo, Sm)_d$—$Ta_e$ magnetic target materials and more particularly relates to methods for production of magnetic target materials with chemically homogeneous microstructures which promote sputter deposited films with higher and more uniform magnetic coercivities than films deposited using similar target products known to the art.

a=0 to 60 atomic %.

b=0 to 20 atomic %.

c=0 to 15 atomic %.

d=combination of one or more of these elements not to exceed 30 atomic %.

e=0.5 to 6 atomic %.

g=0 to 40 atomic %.

f=remainder.

BACKGROUND ART

Data storage disks used in computer hard drives are manufactured by magnetron or RF sputter deposition processes. The disk itself comprises several different layers of material. Typically, thin-film disk technology uses a Al blank as the base substrate material with a hard amorphous Ni—P layer with thickness of about 10 microns electrolessly plated onto it. Johnson et al., IBM J. Res. Develop., Vol. 40, Nos. 5, September 1996, p. 511–536. The Ni—P layer is scribed with fine texturizing grooves. An underlayer of Cr with thickness between 20 to 100 nm is sputter deposited onto the Ni—P layer to ensure nucleation of the magnetic film with the easy axis of magnetization in-plane for longitudinal recording. A Co-based magnetic film, with composition in the ranges' described above, is sputter deposited onto the underlayer with thickness' of about 30 nm for magnetoresistive head applications. Finally, a 10–20 nm protective layer of hydrogenated carbon is reactively sputtered on top of the magnetic layer. Alternate substrate (i.e. glass) and underlayer materials (i.e. Cr—V, Ni—Al, Cr—Ti) are commonly utilized in the data storage industry.

Magnetron sputtering to form the magnetic film on the data storage device (disk), involves the arrangement of permanent or electromagnets behind the magnetic target material (cathode). The applied magnetic field transmits through the target and focuses a discharge plasma onto the front of the target. The front of the target surface is atomized with subsequent deposition of the magnetic target atoms on top of the underlayer of the evolving disk. Typically, sputtering of the various non-magnetic and magnetic layers, comprising the architecture of the disk, is conducted on both sides of the disk.

A potential problem which results during the sputtering of Co-based alloys containing Ta additions is the effect of the homogeneity of the multi-phase target microstructure on the resultant magnetic properties of the deposited film. The maximum solid solubility of Ta in Co is 4 atomic % at 1280 Celsius (Massalski et al. "Binary Phase Diagrams", ASM International, Vol. 2, 1990, p. 1245) as depicted in FIG. 1. As other alloying additions are added to Co, the maximum solid solubility of Ta in the matrix is further decreased. Therefore, the driving force for the formation of eutectic Ta-rich particulates in the microstructure of Co-based magnetic alloys is very large. The eutectic Ta-rich particulates have been identified as possessing a $Co_2Ta$ stoichiometry, (Schlott et al., IEEE Transactions on Magnetics, Vol. 31, No. 6, November 1995, p. 2818–2820; Massalski et al. supra). Even in the case of alloys possessing Ta contents less than the maximum solid solubility limit, the propensity for Ta-rich second-phase formation is very large since these alloys are typically not thermomechanically processed at the eutectic temperature.

Furthermore, even if the Co-based alloys containing Ta are processed within proximity of the eutectic temperature, Ta-rich second-phase formation will occur if sufficient cooling rates are not employed since the solid solubility limit diminishes rapidly with decreasing alloy temperature.

It is fairly typical that a pair of magnetic alloy targets can be used to fabricate in excess of 10,000 individual data-storage disks. Since the magnetic target alloy is continually losing surface atomic layers during the sputtering process, through thickness and in-plane target microstructural homogeneity is essential to ensure film property homogeneity on the many thousands of disks fabricated from each target and the many thousand more fabricated from the numerous targets constituting a production lot or originating from several individual production lots. A production lot represents all the targets that are exposed to exactly the same thermomechanical history (i.e. originating from one melted ingot or one hot-isostatic-press container).

Ta-rich second-phase segregation in the matrix of Co-based magnetic target alloys has been shown to impact deposited film magnetic properties such as Coercivity. When tens of thousands of data storage devices are being made from several targets, it is necessary that the Coercivity response be consistent on all the disks, i.e., quality control, and not be a function of the specific target utilized. Therefore, there is a substantial need in the art for Ta containing Co-based magnetic targets which exhibit consistent performance, both within a target and from target to target.

Standard production practices for magnetic target alloys involve the following thermomechanical steps. See Schlott et al., supra; U.S. Pat. No. 5,468,305; U.S. Pat. No. 5,334, 267; and U.S. Pat. No. 5,282,946. Ingots are fabricated by either casting or Hot-Isostatic-Pressing (HIP ping) of elemental powders. Hot-rolling is then conducted primarily to heal any residual porosity in the ingots and form plates from which the magnetic targets can be obtained. The ingot and plate sizes are pre-determined to enable extraction of the particular target geometry required (i.e. rectangular targets and circular targets possessing a variety of different dimensions). Single-step hot-rolling practices at temperatures between 700F to 2200F are typically employed. After hot-rolling, heat-treatment and cold-texture deformation processes are utilized to reduce the bulk magnetic permeability of the target product. A reduction in bulk magnetic permeability is utilized to improve the efficiency of the sputtering process by facilitating optimum passage of magnetic flux through the bulk of the target. Shunting of magnetic flux within the bulk of the target adversely affects the stability of the sputtering process, material yield of the target and thickness uniformity of the deposited film. Alternate fabrication practices involving water-cooled as-cast target fabrication with no further down-stream thermomechanical processing are also known in the prior art. A review of the prior art reveals that controlling hot-rolling temperatures, or utilization of individual homogenization practices, have not been employed to minimize the formation of Ta-rich second-phase particulates in the target microstructure.

The present invention will focus on the addition of specific homogenization treatments to the fabrication of magnetic target materials in order to minimize and homogenize the presence of Ta-rich second-phase particulates in the microstructure.

SUMMARY OF THE INVENTION

It is accordingly one object of the present invention to provide a method for the production of Ta containing Co-based magnetic targets which promote consistent deposited film magnetic property performance.

A further object of the invention is to provide a process for the production of magnetic targets wherein the potential for formation of a course Ta-rich second phase in the microstructure is reduced.

An even further object of the invention is to provide magnetic target alloys wherein the presence of a Ta-rich second phase in the microstructure has been substantially eliminated.

Other objects and advantages of the present invention will become apparent as the description thereof proceeds.

In satisfaction of the foregoing objects and advantages, the present invention provides a process for the production of magnetic target alloy materials which possess chemically and mechanically uniform microstructures both within a target and from target to target, wherein a homogenization and hot-rolling practice is utilized to dissolve the Ta-rich second-phase back into solution. The process involves soaking the ingots from which the targets are produced at temperatures ranging from 1600° F. to 2600° F. for periods of 10 minutes to 24 hours prior to hot-rolling, optionally using multiple steps, then hot rolling at similar temperatures utilizing at least a 3% reduction per pass, and finally, optionally soaking the rolled plates from which the targets are produced at temperatures ranging from 2000° F. to 2600° F. for periods of 10 minutes to 24 hours. Note, reduction per pass is defined as: $(1-T_o/T_i) \times 100\%$, where $T_i$ is the thickness of the ingot/plate input into the rolling mill and $T_o$ is the thickness after rolling by one pass. Directly following the thermomechanical processing, the cooling rate of the plate must be equal to or faster than an air cool. A cold water quench is preferable. It has been discovered that this practice will retard the formation of Ta-rich second-phase and result in a Co-based magnetic target alloy wherein the tantalum second-phase is substantially minimized or completely eliminated. Also provided by the present invention are target alloys depicting the beneficial effect of a homogenized magnetic target alloy microstructure on the magnetic Coercivity of the resulting sputter deposited thin film.

BRIEF DESCRIPTION OF DRAWINGS

Reference is now made to the drawings accompanying the application wherein.

DESCRIPTION OF THE INVENTION

This invention involves improvements in the performance of magnetic material sputtering targets which are used in the production of data storage disks, in particular, the magnetic film layer comprising the architecture of the data storage disk. The present invention is especially concerned with the homogeneity of magnetic material sputtering targets because the lack of homogeneity can adversely impact the absolute values and uniformity of the deposited film's magnetic properties (i.e. Coercivity). As noted above, a current problem with such targets is inhomogeneity caused by the formation of a Ta-rich second-phase in the microstructure of Co-based alloys. The present invention provides a solution to this problem.

The magnetic target alloys with which this invention is concerned can be produced from any of the well-known magnetic target alloys: $Co_f$—$Cr_a$—$Ni_g$—$Pt_b$—$B_c$—$(Si,Zr,Fe,W,Mo,Sm)_d$—$Ta_e$ where a=0 to 60 atomic %, b=0 to 20 atomic %, c=0 to 15 atomic %, d=combination of one or more of these elements not to exceed 30 atomic %, e=0.5 to 6 atomic %, g=0 to 40 atomic %, and f=remainder. Many different alloys are used in the production of magnetic target alloys although certain representative alloys are preferred in this invention. The alloys selected to demonstrate the homogenization practices presently discussed are Co-10Cr-4TA, Co-20Cr-8Pt, Co-13Cr-4Ta, Co-12Cr-4Ta-10Ni, Co-14Cr-6Ta-8Ni and Co-18Cr-10Pt-3Ta (all numbers refer to elemental concentrations in atomic %).

Irrespective of the alloy from which the target is produced, it is necessary that the resulting targets exhibit substantially identical coercivities and remain homogeneous. Unfortunately, the element tantalum (Ta) has a very low solid solubility in cobalt based alloys, the maximum solid solubility of Ta in Co is 4 atomic % at 1280 Celsius (Massalski et al. supra). As other alloying additions are added to Co, the maximum solid solubility of Ta in the matrix is further decreased. Therefore, the driving force for the formation of incoherent Ta-rich particulates in the microstructure of Co-based magnetic alloys is very large. Even in the case of alloys possessing Ta contents less than the maximum solid solubility limit, the propensity for Ta-rich second-phase formation is very large since these alloys are typically not thermomechanically processed at the eutectic temperature. Furthermore, even if the Co-based alloys containing Ta are processed within proximity of the eutectic temperature, Ta-rich second-phase formation will occur if sufficient cooling rates are not employed since the solid solubility limit diminishes rapidly with decreasing alloy temperature.

Figure 1:
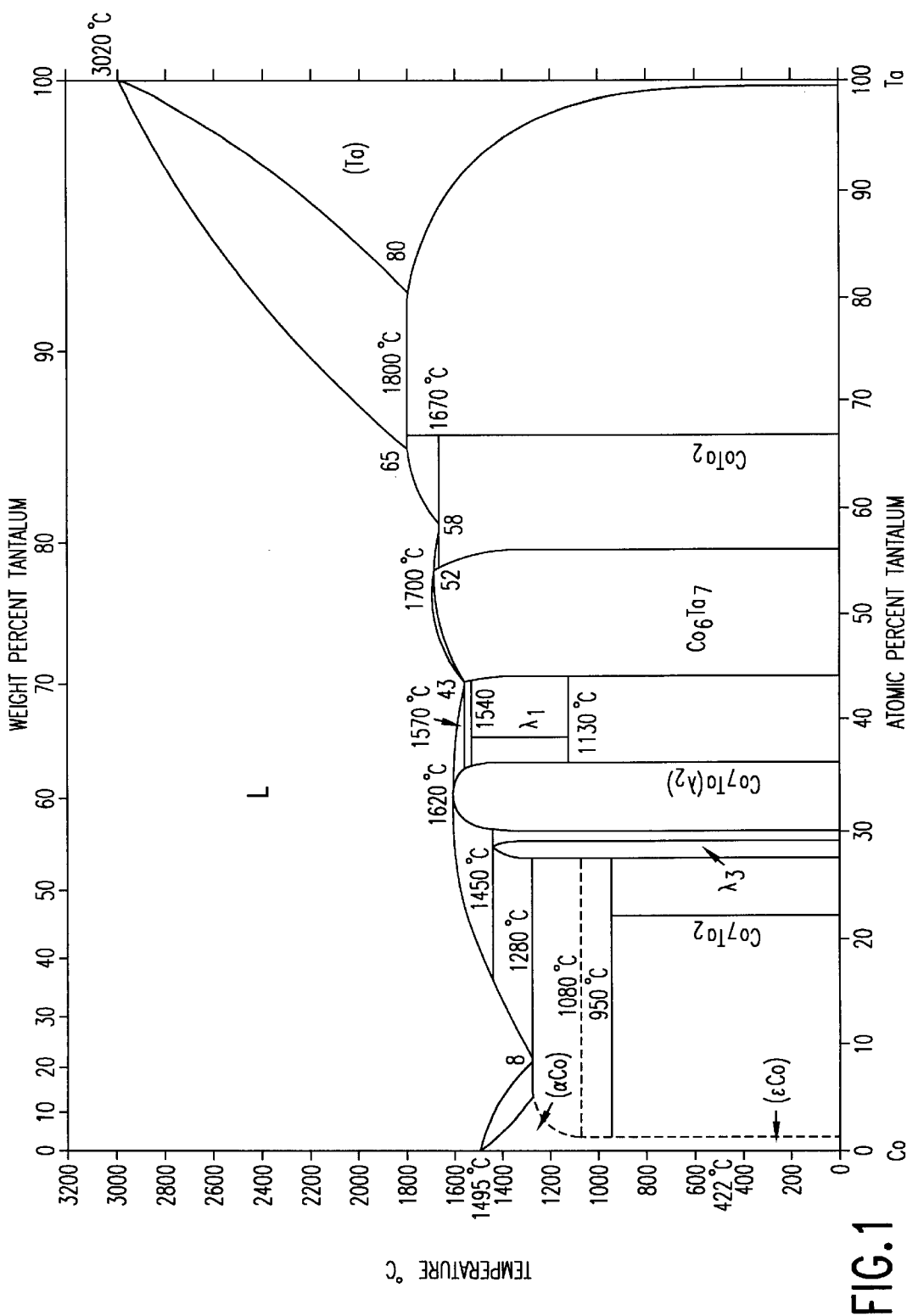
FIG. 1 is a Co—Ta binary phase diagram.
Figure 2A:
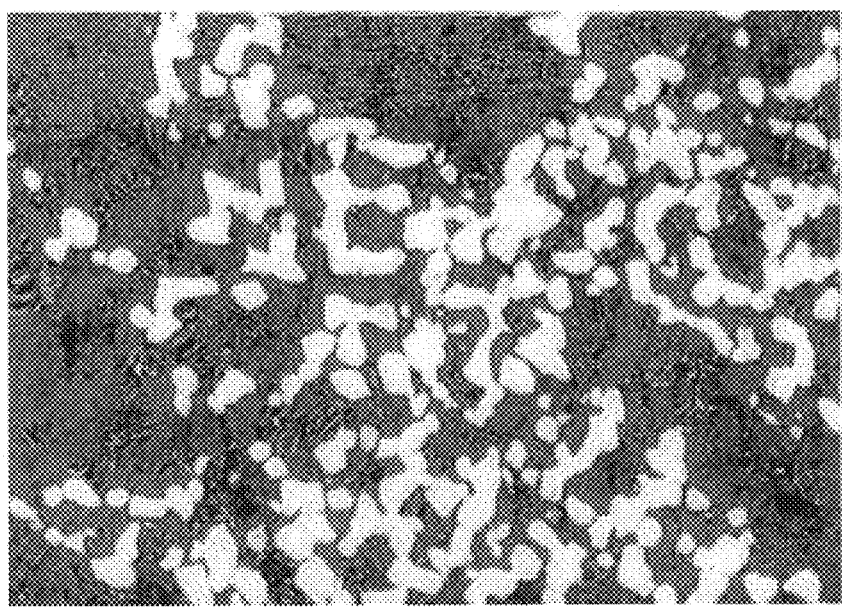
FIGS. 2a and 2b are comparative SEM-BEI images of standard and homogenized fabrication practices, respectively, for Co-10Cr-4Ta.
Figure 2B:
Figure 3A:
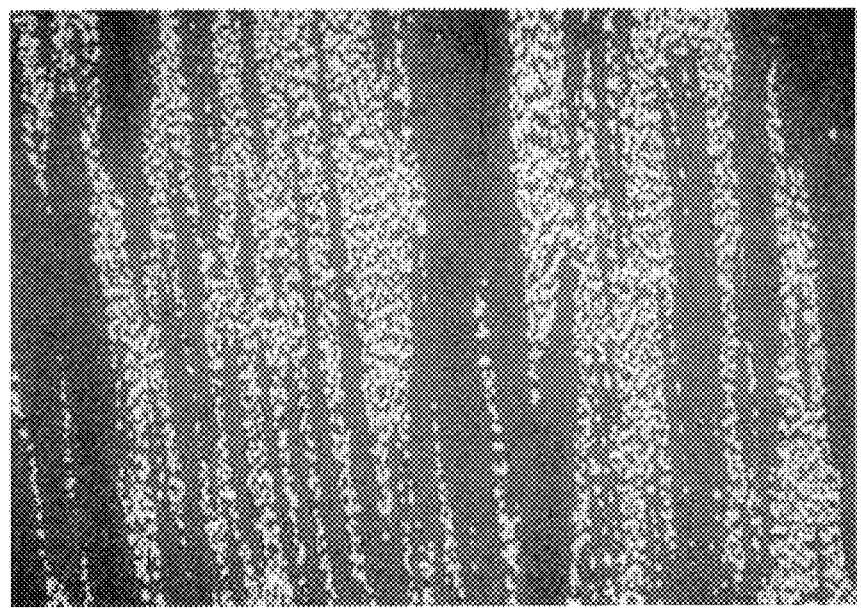
FIGS. 3a and 3b are comparative SEM-BEI images of standard and homogenized fabrication practices, respectively, for Co-14Cr-6Ta-8Ni.
Figure 3B:
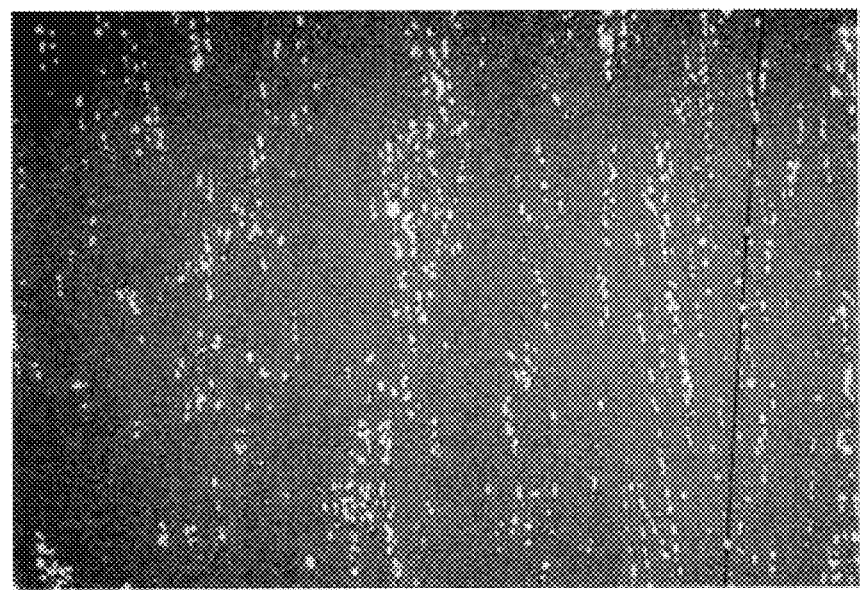
Figure 4A:
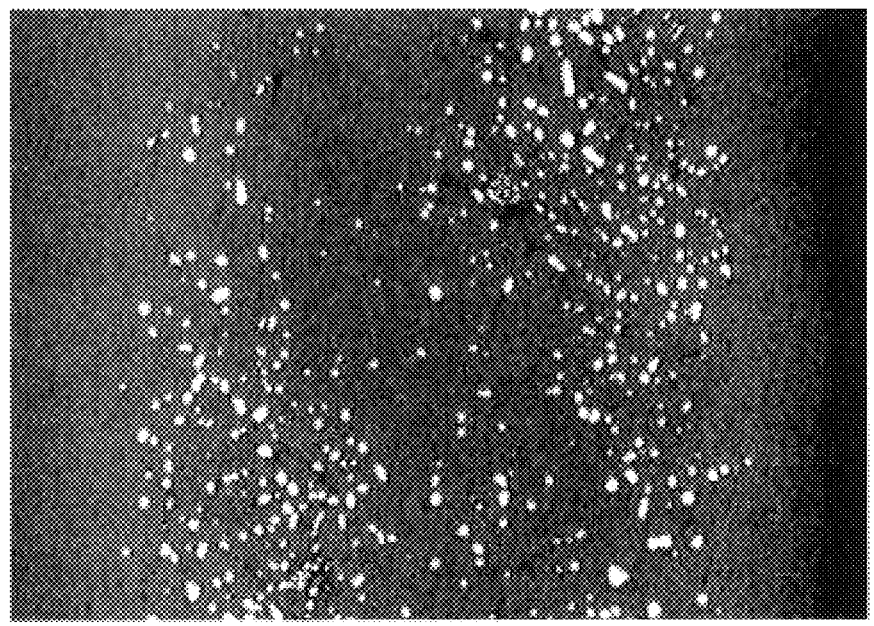
FIGS. 4a and 4b are comparative SEM-BEI images of standard and homogenized fabrication practices, respectively, for Co-18Cr-10Pt-3Ta.
Figure 5A:
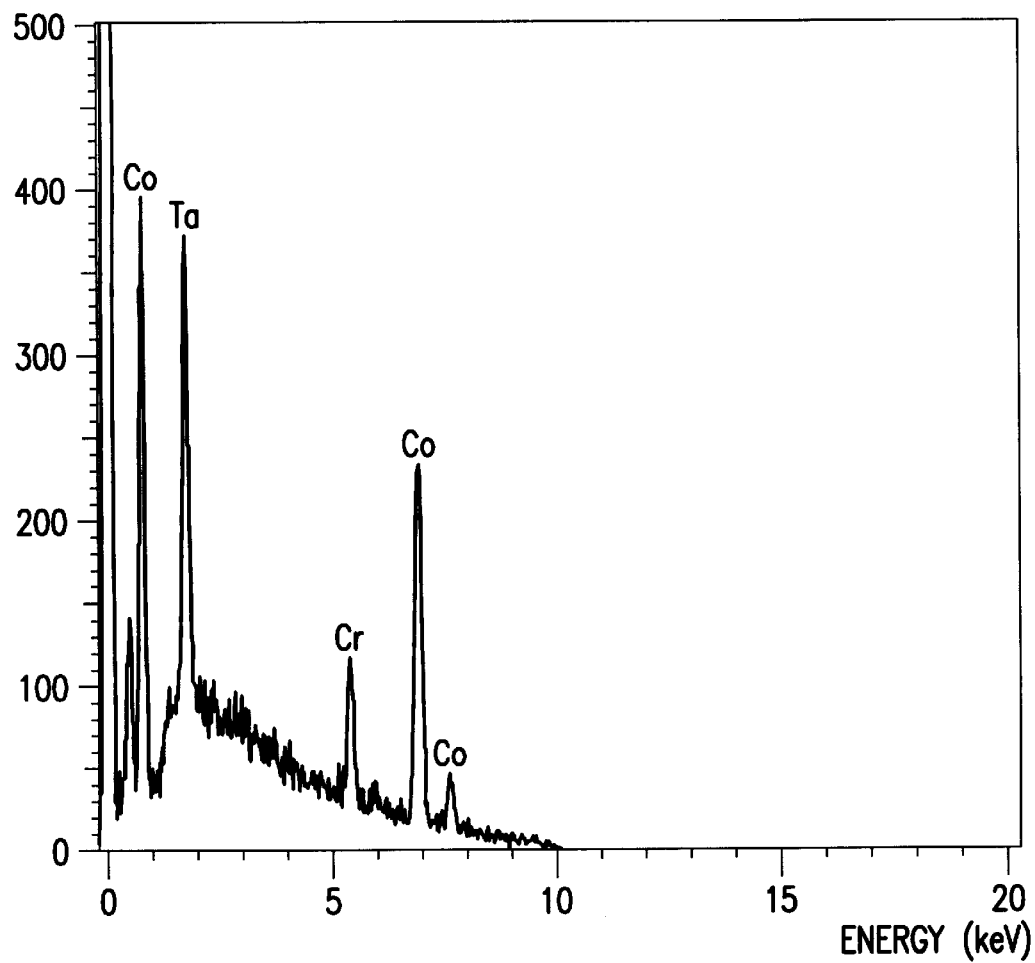
FIGS. 5a and 5b are graphs showing SEM-EDS of the matrix and second phase particles, respectively, of Co-18Cr-4Ta.
Figure 5B:
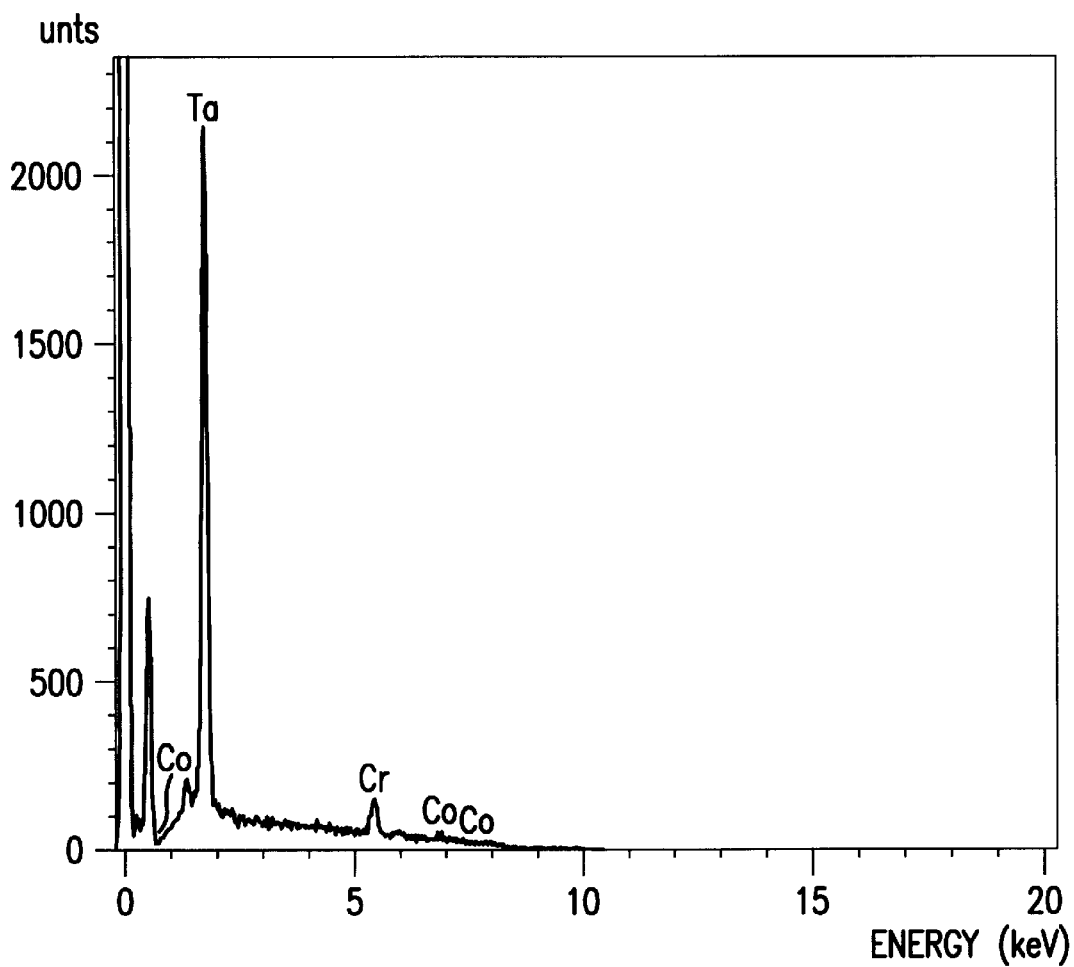
Figure 6A:
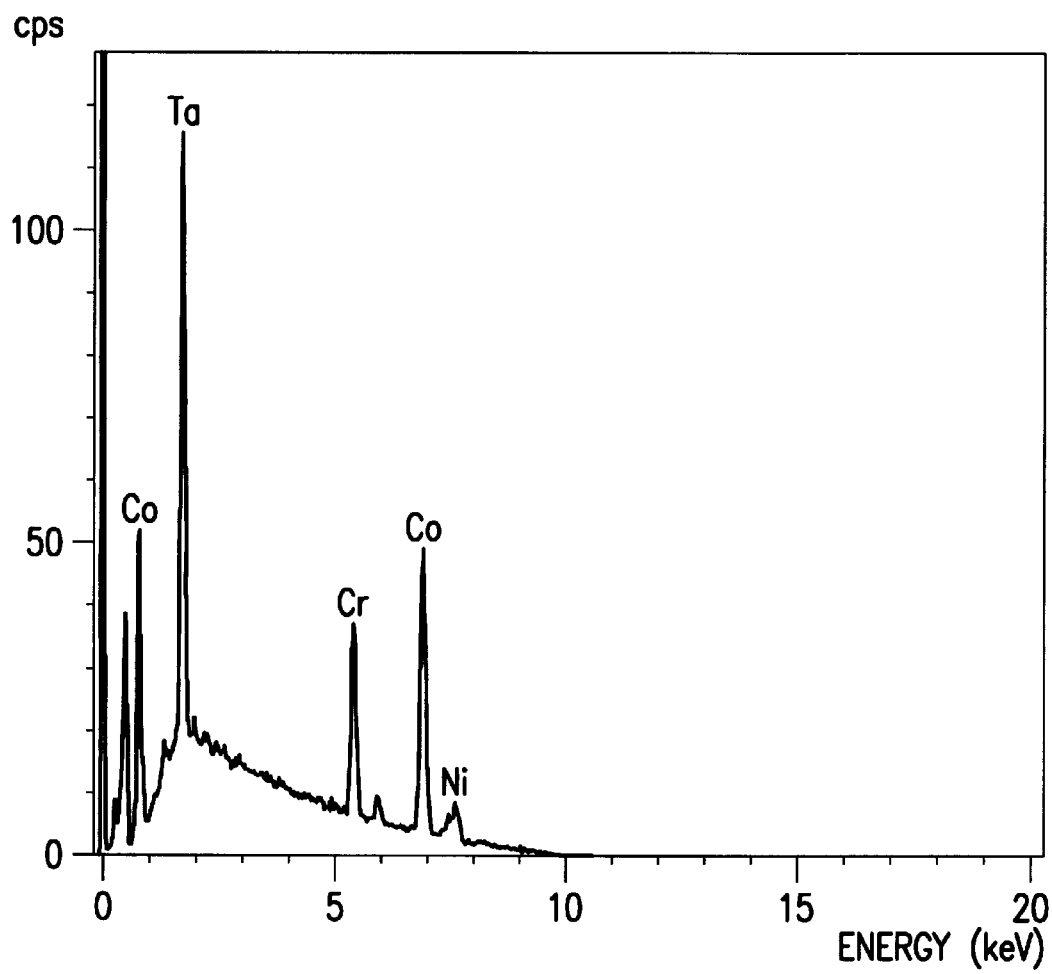
FIGS. 6a and 6b are graphs showing SEM-EDS of matrix phase and second phase particles, respectively, in Co-14Cr-6Ta-8Ni.
Figure 6B:
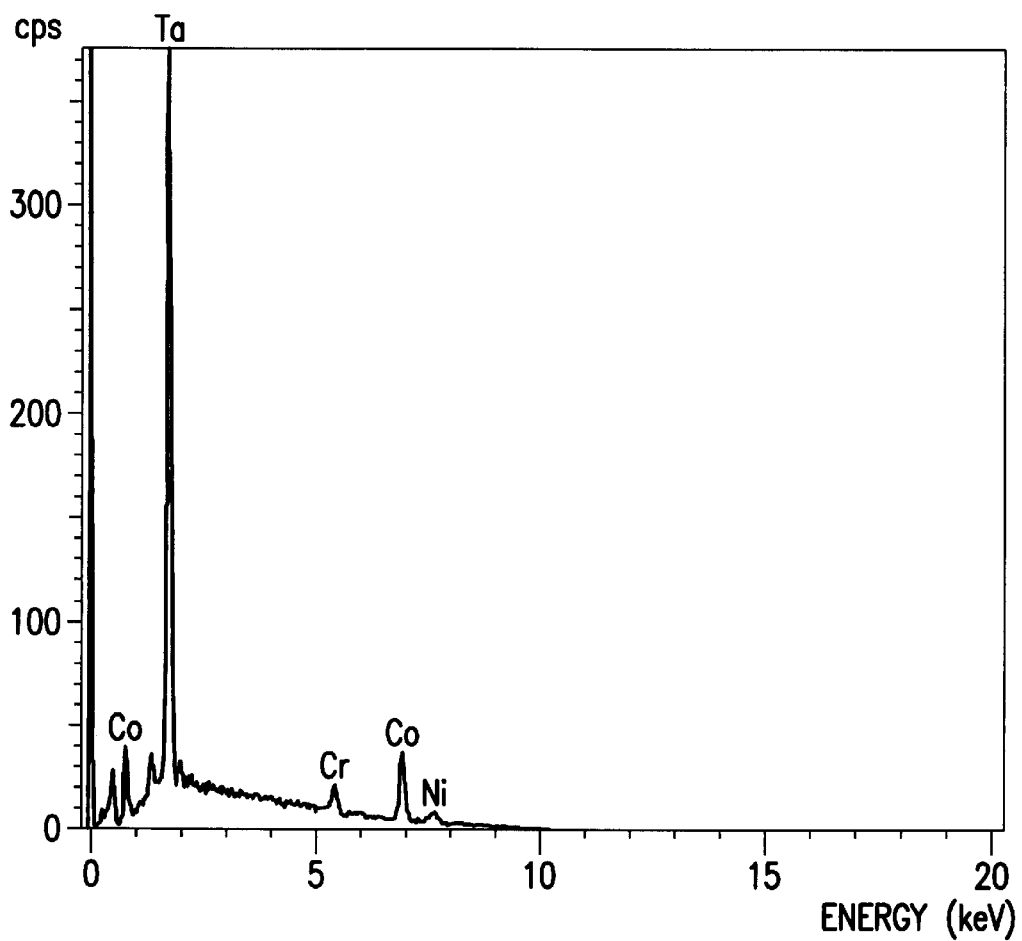
Figure 7A:
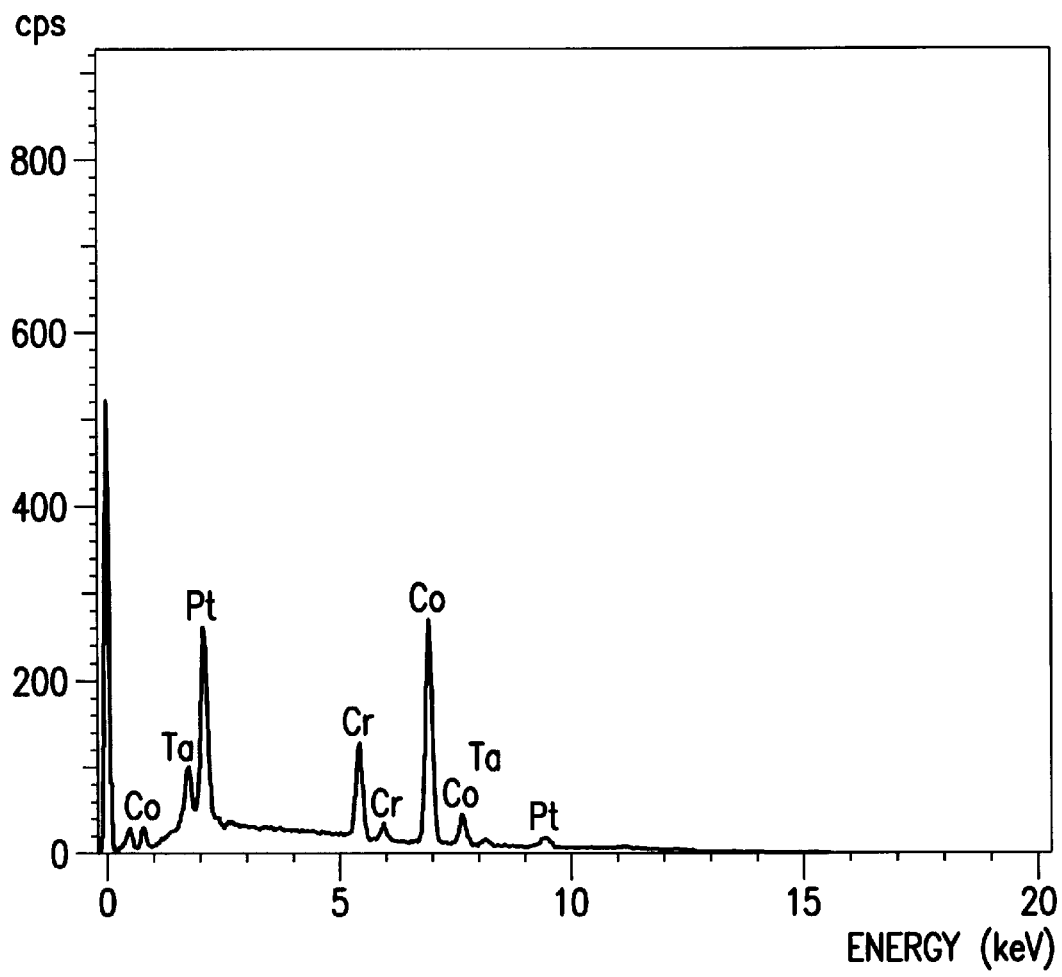
FIGS. 7a and 7b are graphs showing SEM-EDS of matrix phase and second phase particles, respectively, of Co-18Cr-10Pt-3Ta.
Figure 7B:
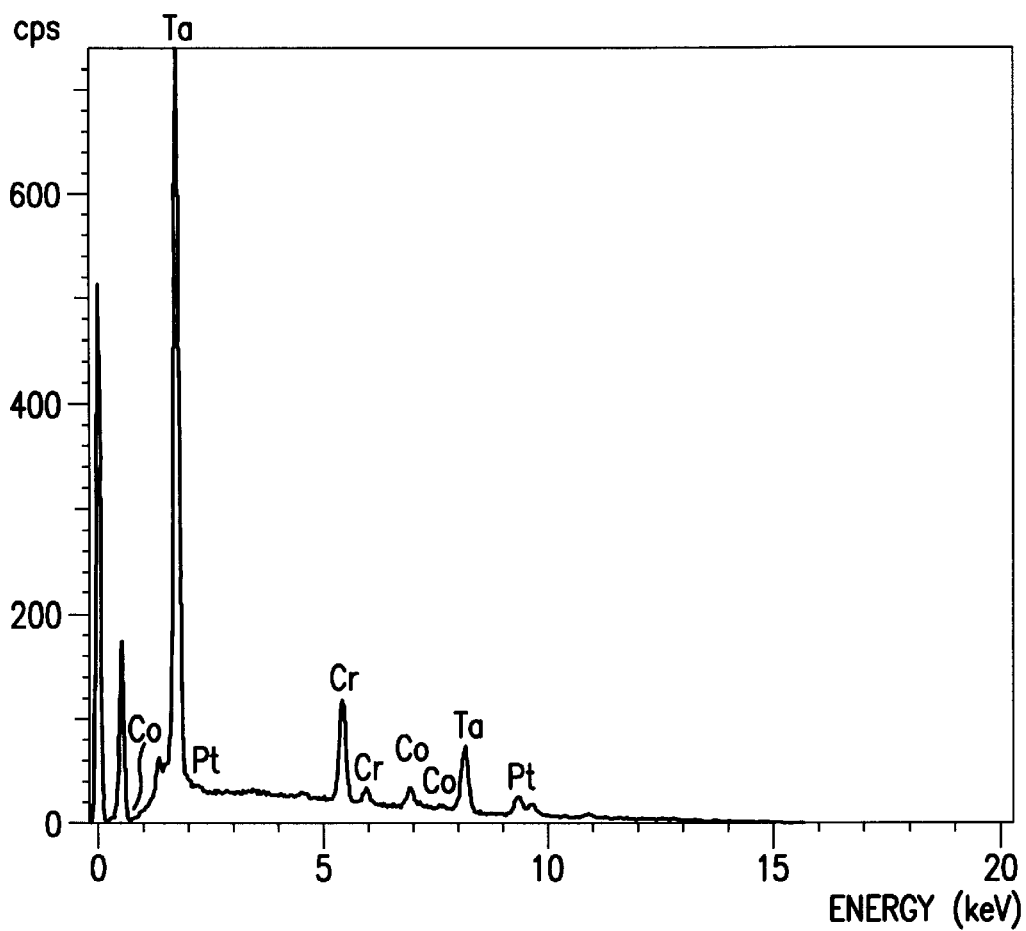
Figure 8A:
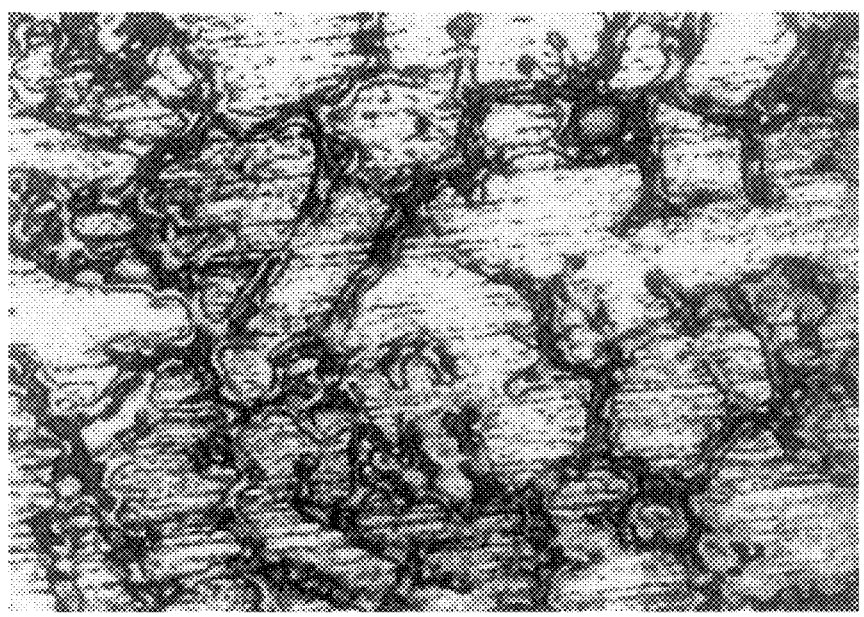
FIGS. 8a and 8b show the as-cast air-cooled and water-cooled, respectively, microstructure of Co-10Cr-4Ta.
Figure 8B:
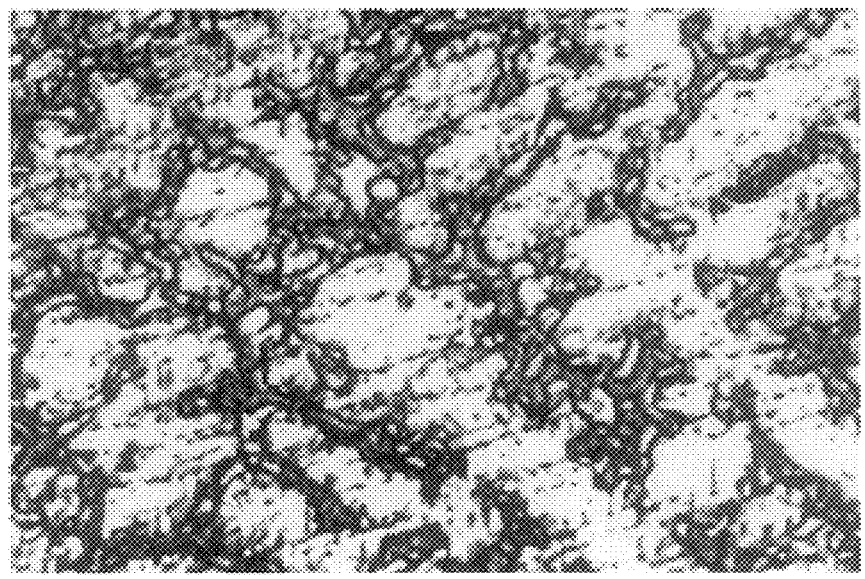

FIGS. 2a, 3a and 4a are Scanning-Electron-Microscopy (SEM) Back-Scattered-Electron-Images (BEI) of the microstructures of Co-10Cr-4Ta, Co-14Cr-6Ta-8Ni and Co-18Cr-10Pt-3Ta, respectively, fabricated using standard fabrication practices. The dark matrix phase and white second-phase for the three microstructures were identified using SEM Energy-Dispersive-Spectroscopy (EDS). FIGS. 5, 6 and 7 represent the SEM-EDS spectra for the matrix phase and second-phase in the microstructures of the Co-10Cr-4Ta, Co-14Cr-6Ta-8Ni and Co-18Cr-i Pt-3Ta alloys, respectively, fabricated using standard fabrication practices. FIGS. 5 to 7 demonstrate that the second-phase particles in Ta containing Co-based alloys are always predominantly Co—Ta, regardless of the other alloying additions. FIG. 8a depicts the as-cast air-cooled microstructure of the Co-10Cr-4Ta alloy. The white appearing phase, as in the case of FIGS. 2 to 4, has been identified using SEM-EDS as the Ta-rich second-phase. This figure demonstrates that second-phase formation occurs during casting of the alloy. FIG. 8b depicts the as-cast water-cooled microstructure of the Co-10Cr4Ta alloy. FIG. 8b demonstrates that even very rapid cooling after casting is not sufficient to prevent the formation of deleterious second-phase networks in the microstructure of Ta-containing Co-based alloys. It was this result that provided the impetus for the development of post-casting homogenization practices for Ta-containing Co-based alloys of this invention.

This analysis and the results of extensive investigations by the inventors on such alloy systems indicate that Ta-rich second phase formation is detrimental to product microstructural and property homogeneity and adversely affects the performance and consistency of the deposited magnetic film. As a result, a homogenization/hot-rolling practice has been developed for treatment of such alloys to dissolve the Ta-rich second phase back into solution. The process of the invention involves soaking the ingots from which the targets are produced at temperatures ranging from 1600° F. to 2600° F. for periods of 10 minutes to 24 hours prior to hot-rolling or after casting in the case of as-cast product. Various steps can be used within this temperature range using either the lower or higher temperature as the initial step. Thereafter, the ingot is hot-rolled at temperatures ranging from 1600° F. to 2600° F., utilizing at least a 3% reduction per pass. Ingot re-heating, between 5 to 120 minutes, can be employed during the hot-rolling procedure to ensure that the temperature range remains in the prescribed range. Maintaining a minimum reduction per pass of 3% ensures mechanical homogenization of the microstructure in addition to the chemical homogenization. The minimum 3% reduction per pass is especially important in the last 5 passes of the rolling campaign. This requirement is particularly important in the case of alloys where some remnant Ta-rich second-phase is present in the microstructure, because the deformation processing promotes uniform dispersion of the remnant second-phase and neutralizes its propensity to form coarse inhomogeneously distributed aggregates.

Various hot-rolling steps can be used within the temperature range of 1600° F. to 2600° F. using either the lower or higher temperature as the initial step. Either directly after hot-rolling or after further downstream thermomechanical processing to optimize on the bulk properties of the target material. (See Schlott et al. supra; Weigert et al., Mat. Sci and Engineering, A139, 1991, p. 359–363) An optional soaking of the rolled plates from which the targets are produced at temperatures ranging from 2000° F. to 2600° F. for periods of 10 minutes to 24 hours can be employed as a final homogenization step. Directly following hot-rolling or the final optional homogenization step, the cooling rate of the plate must be equal to or greater than an air cool. A cold water quench is preferable.

Figure 9:
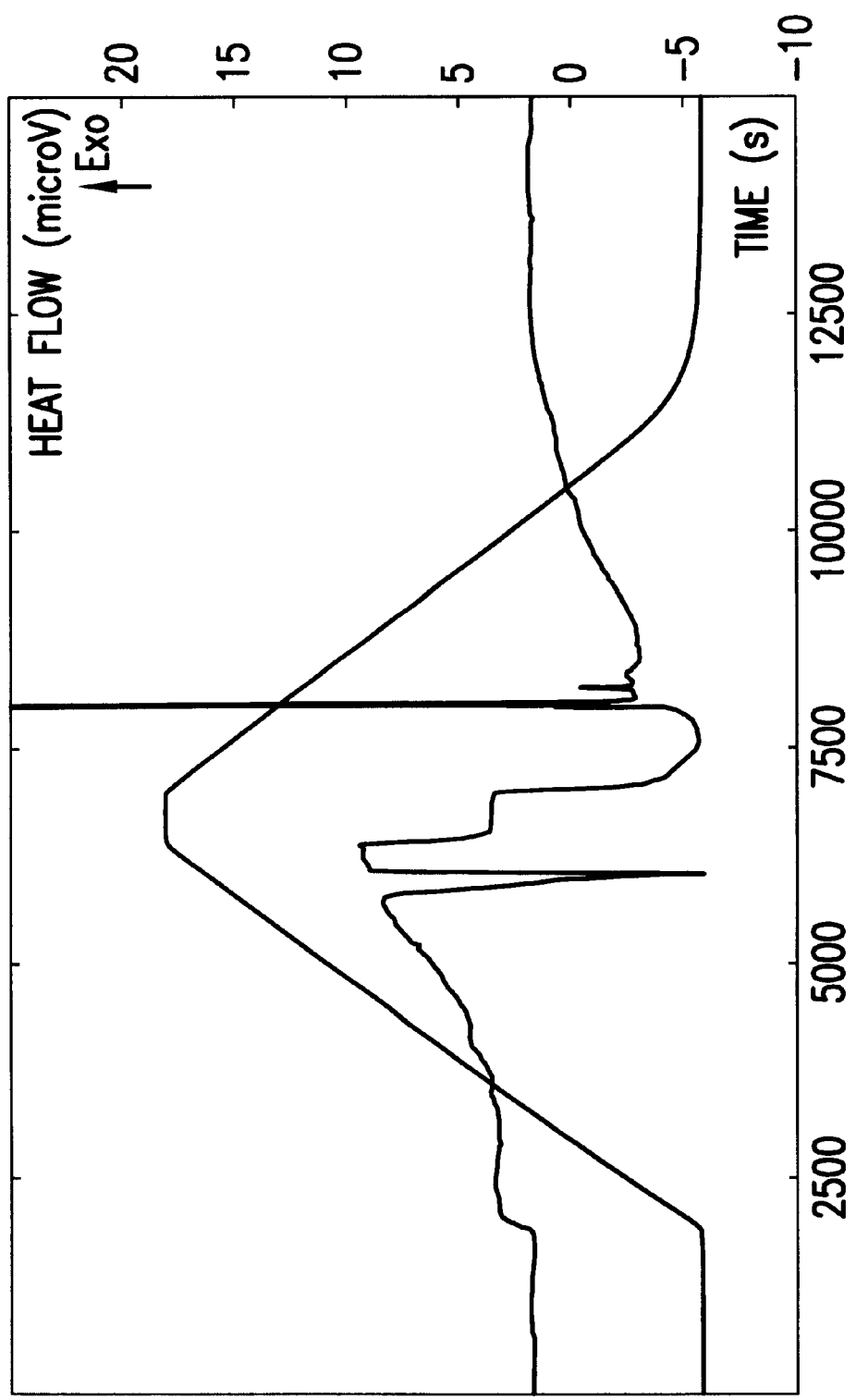
FIG. 9 is a DTA trace of Co-14Cr-6Ta-8Ni.
Figure 10:
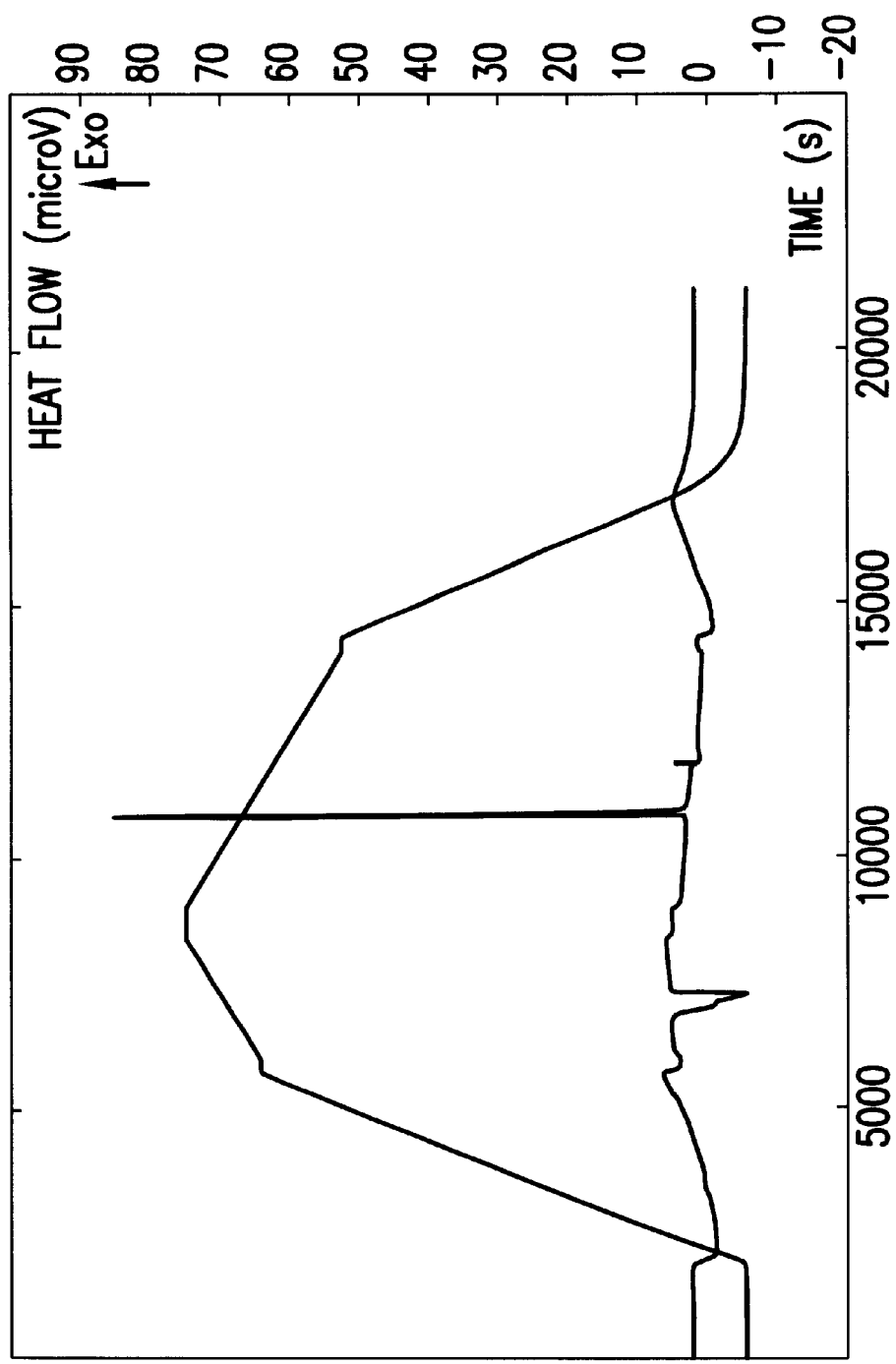
FIG. 10 is a DTA trace of Co-18Cr-10Pt-4Ta.
Figure 11:
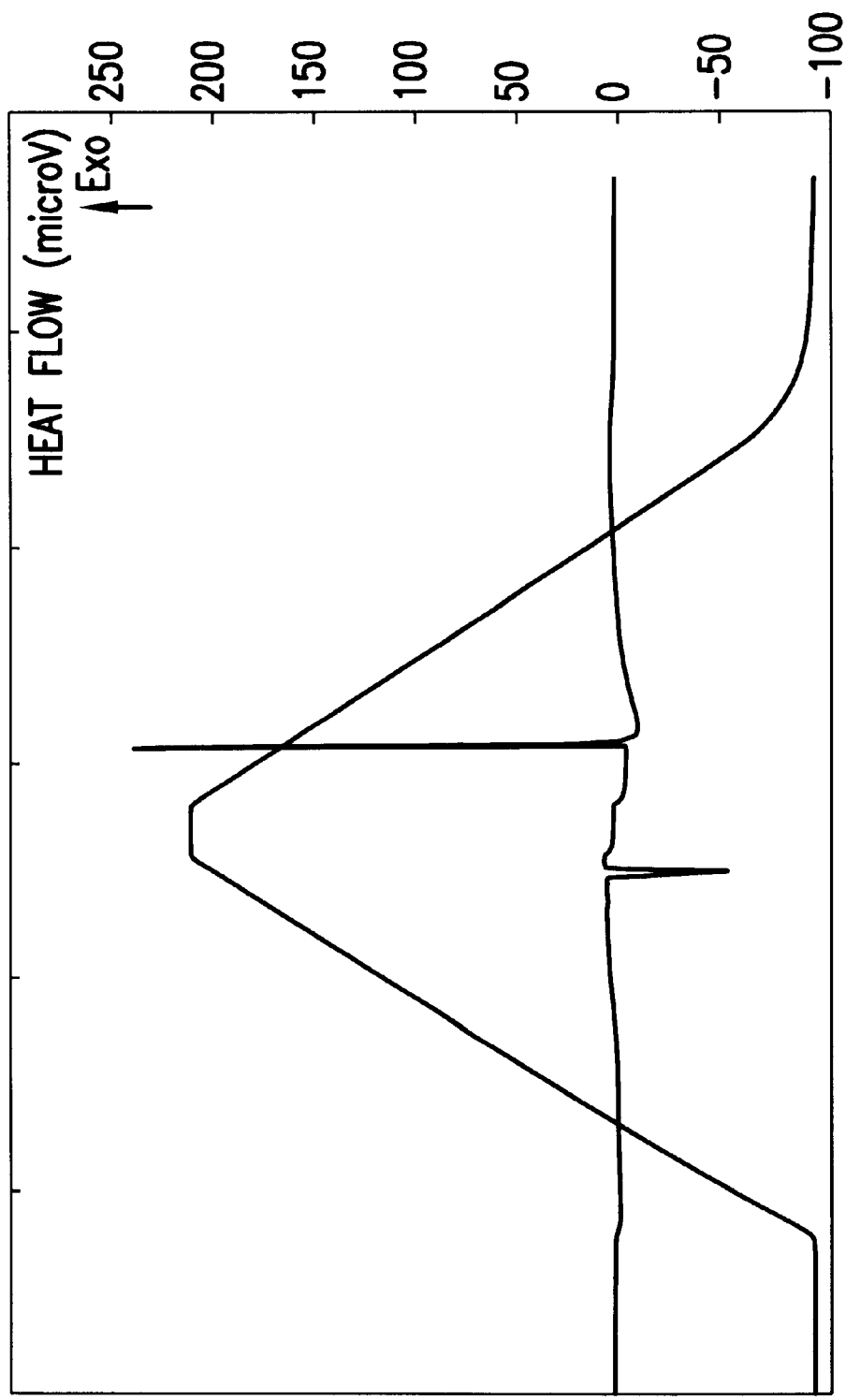
FIG. 11 is a DTA trace of Co-20Cr-8Pt.

The homogenization practice of this invention was developed using Differential Thermal analysis (DTA) on a whole spectrum of Co-based alloys. DTA traces enable identification of solid/liquid, solid/solid and order/disorder phase transformation temperatures and the corresponding enthalpies of transformation. DTA involves heating and cooling samples at fixed temperature rates and monitoring the power of the temperature controller. Exothermic or endothermic phase transformation temperatures can be very accurately determined by voltage deviations in the power signal. The integrated area of the voltage signals can be utilized to calculate the actual energy of transformation. FIGS. 9, 10 and 11 are DTA traces of Co-14Cr-6Ta-8Ni, Co-18Cr-10Pt-3Ta and Co-20Cr-8Pt alloys, respectively. In these figures, reading from left to right, the first downward (endothermic) pointing peak represents the alloy solidus temperature (solid/liquid transformation temperature during heating). The first, and largest, upward (exothermic) pointing peak represents the liquidus temperature (liquid/solid transformation temperature during cooling). Comparison of the Ta containing alloys (FIGS. 9 and 10) with the non-Ta containing alloy (FIG. 11) reveals the presence of the second exothermic Ta-rich second-phase formation peak, at a temperature below the liquidus temperature. This phase is most likely the $\lambda_3$ $Co_2Ta$ phase. FIG. 11 demonstrates Co—Cr—Pt alloys possess chemically homogeneous microstructures due to the lack of Ta as an alloying addition. Knowledge of the solidus, liquidus and second-phase formation temperature enables determination of a homogenization practice at temperatures near the maximum solid solubility of Ta-containing alloys in order to ensure maximum dissolution of the Ta atoms into the matrix phase.

Utilizing the information from the DTA traces, a homogenization practice, prior to hot-rolling, at temperatures controlled between 2200F and 2600F for a period of time between 2 to 6 hours was selected for the alloys presented in FIGS. 2b to 4b. After the homogenization treatment, the alloys were hot-rolled in the same temperature range as that utilized in the homogenization treatments. Water quenching was employed after hot-rolling and the alloys were given the same downstream thermomechanical treatments and machined into the same final product configurations as the alloys depicted in FIGS. 2a to 4a.

Figure 4B:
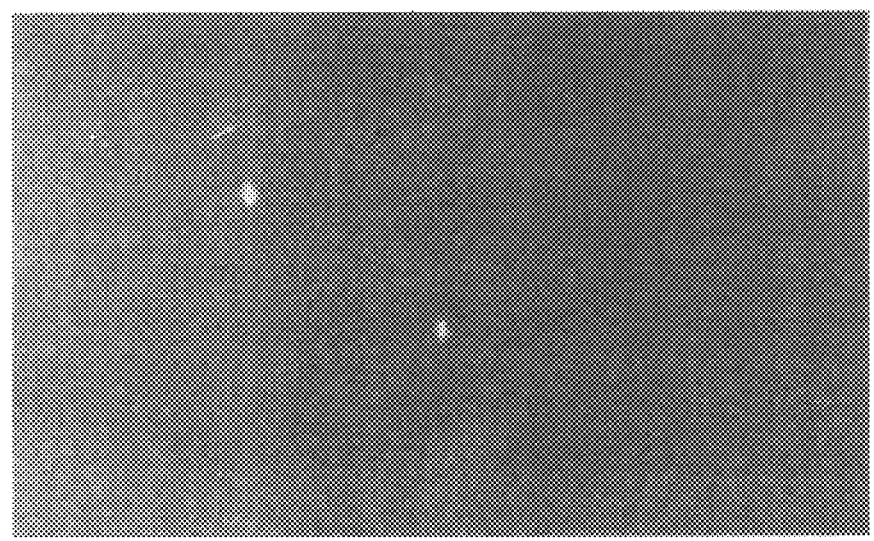
Figure 12:
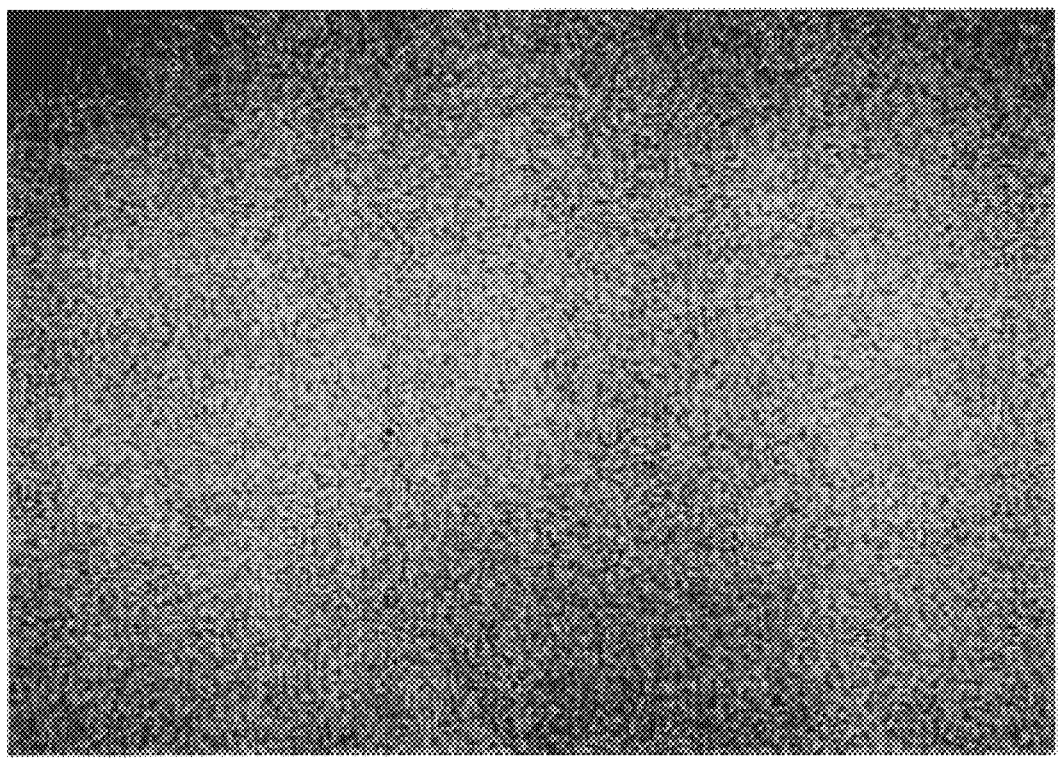
FIG. 12 is an SEM-BEI of the same area as FIG. 4b taken at lower magnification.

FIGS. 2b, 3b and 4b are Scanning-Electron-Microscopy (SEM) Back-Scattered-Electron-Images (BEI) of the microstructures of Co-10Cr-4Ta, Co-14Cr-6Ta-8Ni and Co-18Cr-10Pt-3Ta, respectively, fabricated using the new homogenized fabrication practice. As in FIGS. 2a to 4a, the dark matrix phase and white Ta-rich second-phase for the three microstructures were identified using SEM Energy-Dispersive-Spectroscopy (EDS). Comparison of FIGS. 2b to 4b with FIGS. 2a to 4a reveals that the homogenization practice employed successfully minimized the presence of Ta-rich second-phase in the microstructure. FIG. 12 is a lower magnification picture than FIG. 4b conclusively demonstrating the successful dissolution of the Ta-rich second-phase particulates. Table 1 compares the Volume Percent Second Phase (VPSP) prior to and after homogenization calculated using a standard point counting method.

TABLE 1

| Alloy | VPSP (before homog.) | VPSP (after homog.) | Grain Size (before homog.) | Grain Size (after homog.) |
|---|---|---|---|---|
| Co-10Cr-4Ta | 13% | 1% | 20 microns | 280 microns |
| Co-14Cr-6Ta-8Ni | 45% | 12% | 30 microns | 33 microns |
| Co-18Cr-10Pt-3Ta | 15% | 2% | 81 microns | 150 microns |

The results in Table 1 demonstrate that the homogenization practice developed is very effective in minimizing the chemical inhomogeneity in the microstructure of Ta containing Co-based alloys. In the case of Co-14Cr-6Ta-8Ni, the VPSP after chemical homogenization is higher than in the other alloys due to the higher Ta content of this alloy. In cases like this, where the alloy Ta content significantly exceeds the solid-solubility limit, it is thermodynamically impossible to get rid of all the second-phase particles. However, by utilizing rolling reductions greater than 3% per pass, the remnant Ta-rich second-phase particles can be mechanically homogenized. Mechanical homogenization is employed to shear the Ta-rich particles to render them as small as possible and introduce enough deformation in the microstructure to minimize through-thickness second-phase morphology gradients.

Figure 13A:
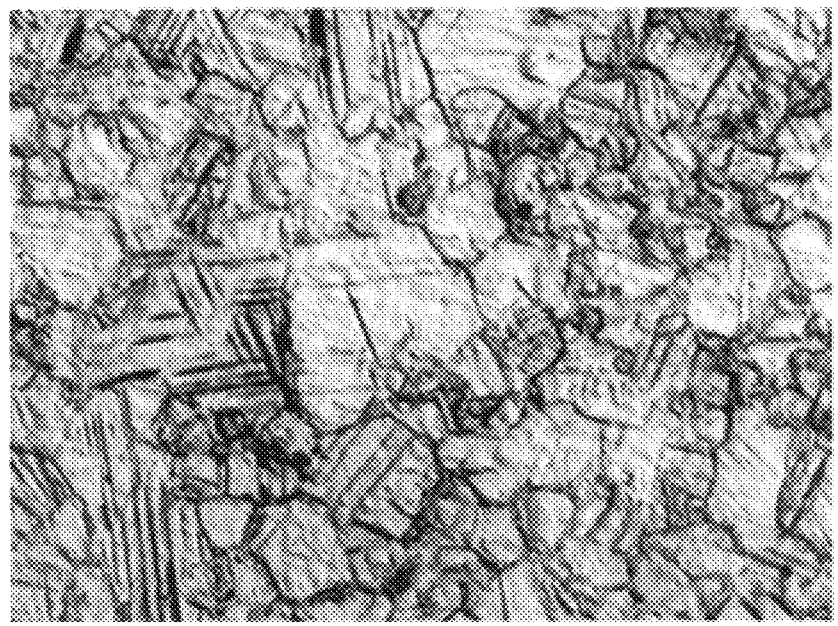
FIG. 13a is an optical micrograph of Co-10Cr-4Ta fabricated using standard practice (600×)
Figure 13B:
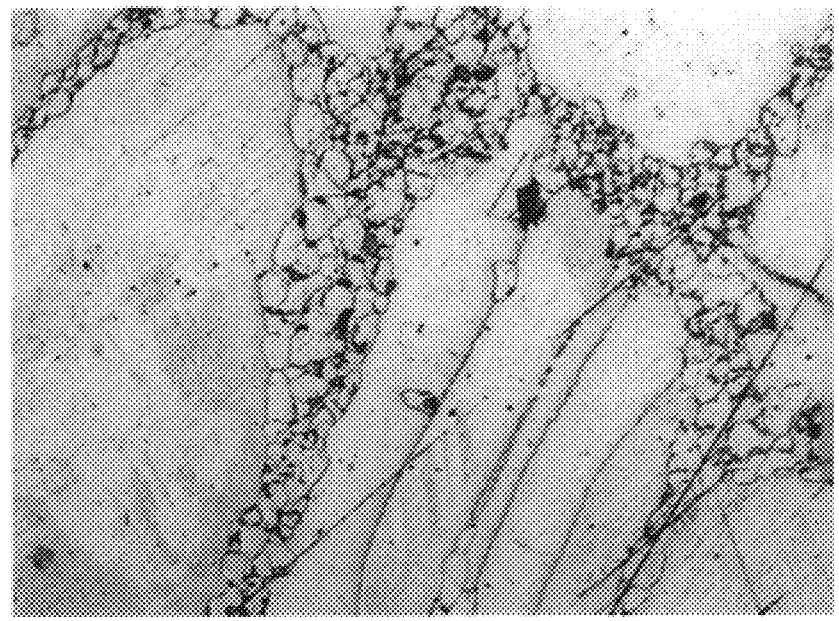
FIG. 13b is an optical micrograph of Co-10Cr-4Ta fabricated using the homogenized practice (150×)
Figure 14A:
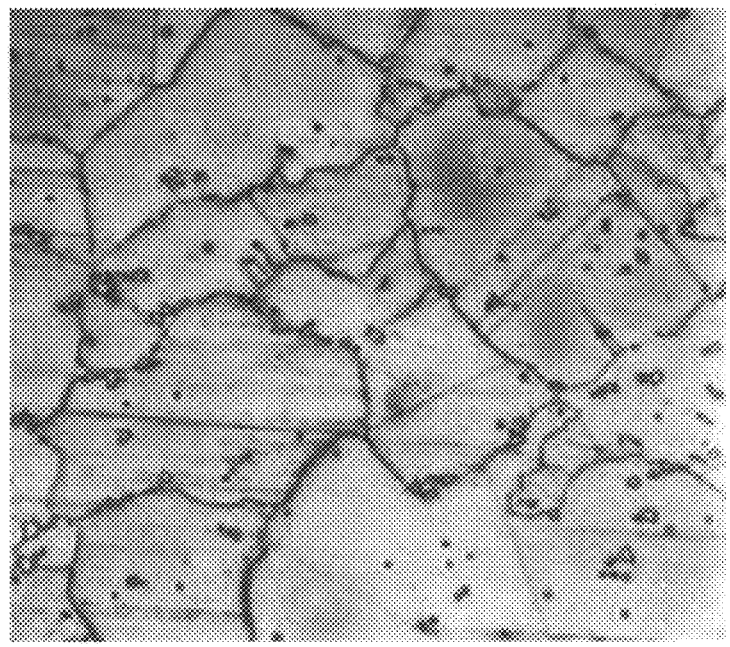
FIGS. 14a and 14b are comparative optical micrographs of Co-14Cr-6Ta-8Ni, fabricated using standard and homogenized practices, respectively, (270×)
Figure 14B:
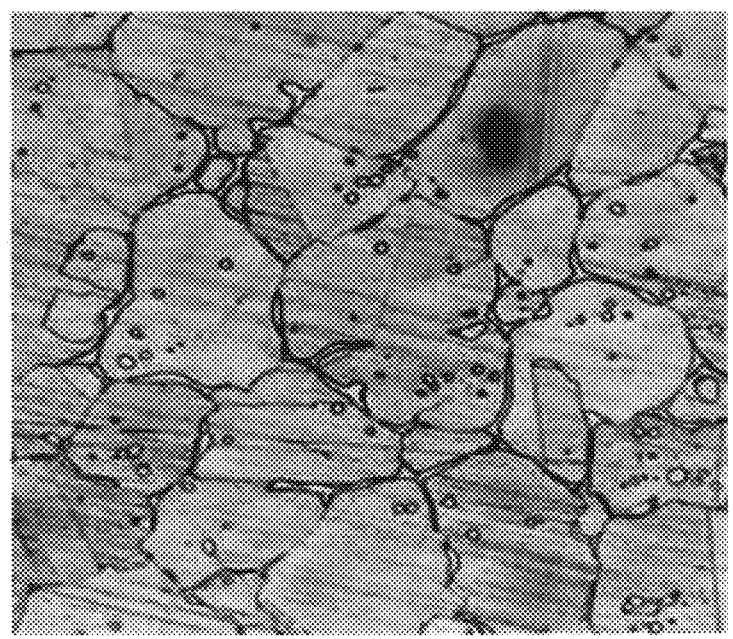
Figure 15A:
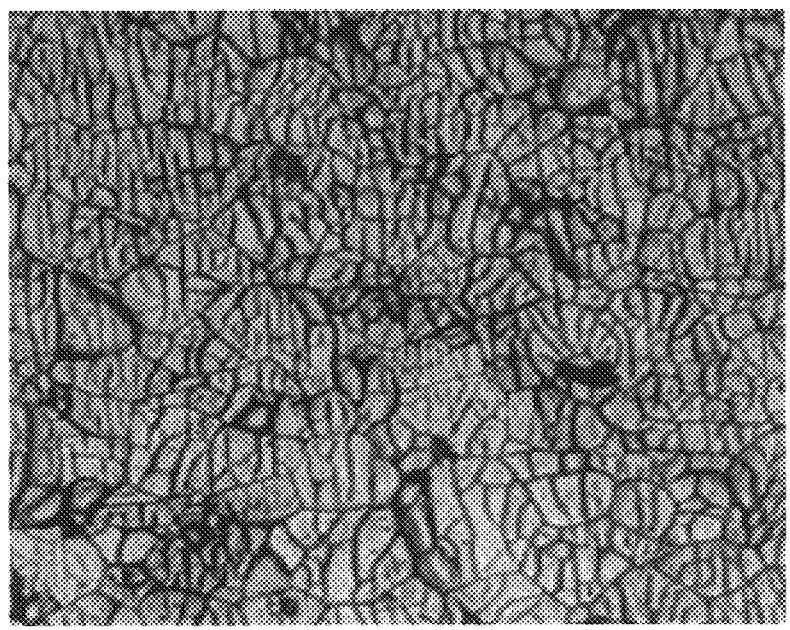
FIG. 15a is an optical micrograph of Co-18Cr-10Pt-3Ta without using the homogenization practice (213×)
Figure 15B:
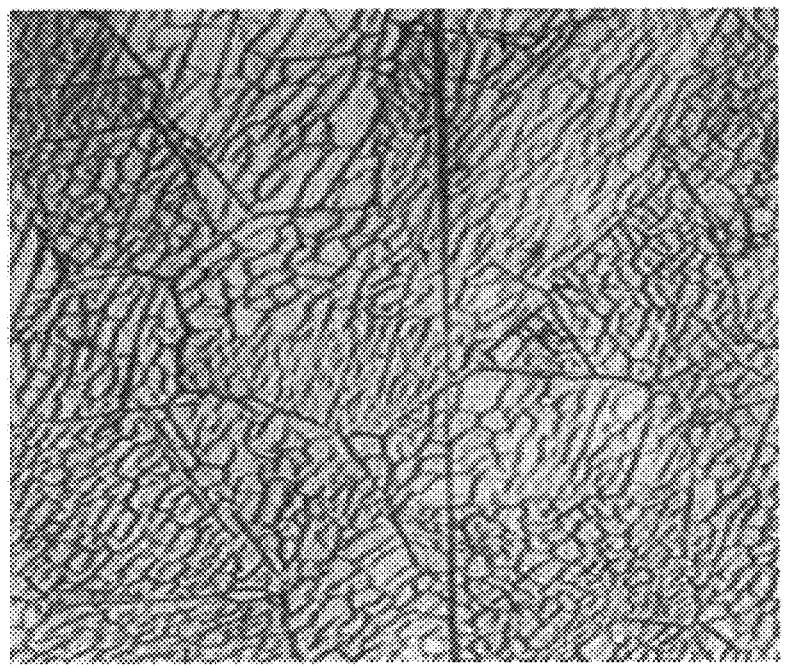
FIG. 15b is an optical micrograph of Co-18Cr-10PT-3Ta using homogenization practice (185×)

FIGS. 13, 14 and 15 are optical micrographs of the microstructures of Co-10Cr-4Ta, Co-14Cr-6Ta-8Ni and Co-18Cr-10Pt-3Ta fabricated using the standard and new-homogenization fabrication practices. These figures, and the average grain-size data summarized in Table 1, demonstrate that the homogenization practice can result in an increase in average product grain size. The higher processing temperatures, soaking or rolling, typically associated with the homogenization practice described in the present document result in a greater propensity for grain growth in the alloy microstructures. This is especially true in the lower Ta containing alloys, where the almost complete dissolution of second-phase particles removes particulate pinning points that retard microstructural grain growth.

The larger alloy grain sizes depicted in FIGS. 13b to 15b are typical of one-step homogenizing or roll/homogenizing treatments. More involved multi-step roll/homogenize processing practices, within the temperature ranges specified in this patent, can be employed to minimize homogenized product grain size.

The numerous "scratches" on the surface of the optical metallographs are most likely a combination of three things: (1) microcracks introduced during polishing of the samples, (2) preferential etching of deformation-twin boundaries intersecting the polished surface and (3) preferential etching of dislocation sub-boundaries intersecting the polished surface. The morphology of the "scratches" is very reminiscent of a dislocation polygonization reaction. Co-based alloys are allotropic in nature and can possess FCC, HCP or combination FCC/HCP crystallography. Dislocation polygonization occurs during elevated temperature deformation of FCC and HCP materials and is a manifestation of dynamic recovery and work-hardening processes. Bartholomeusz et al., Metallurgical Transactions A. Vol 25, 1994, p. 2161–2171; Bartholomeusz et al. Material Science and Engineering, A 201, 1995, p. 24–31.

Figure 16A:
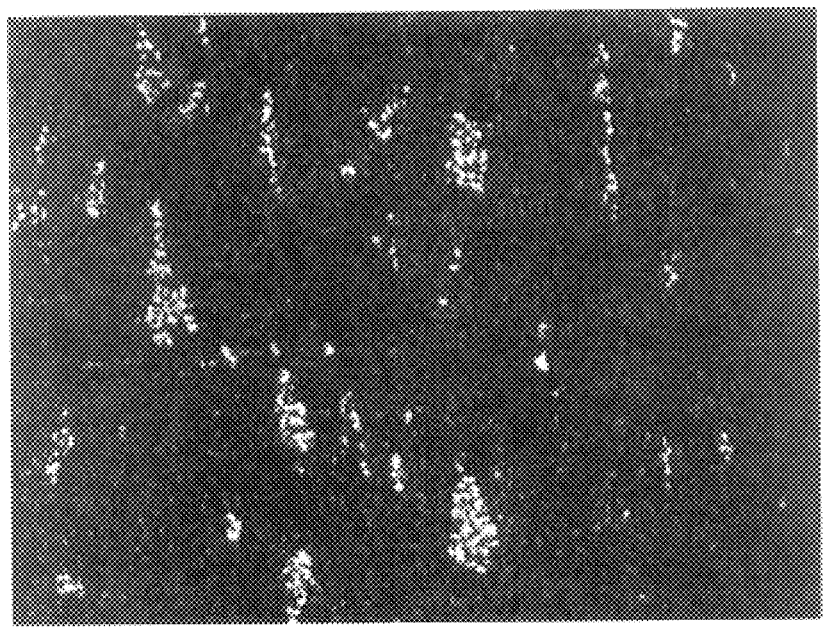
FIG. 16a is a SEM-BEI image of a Target A fabricated using standard practice.
Figure 16B:
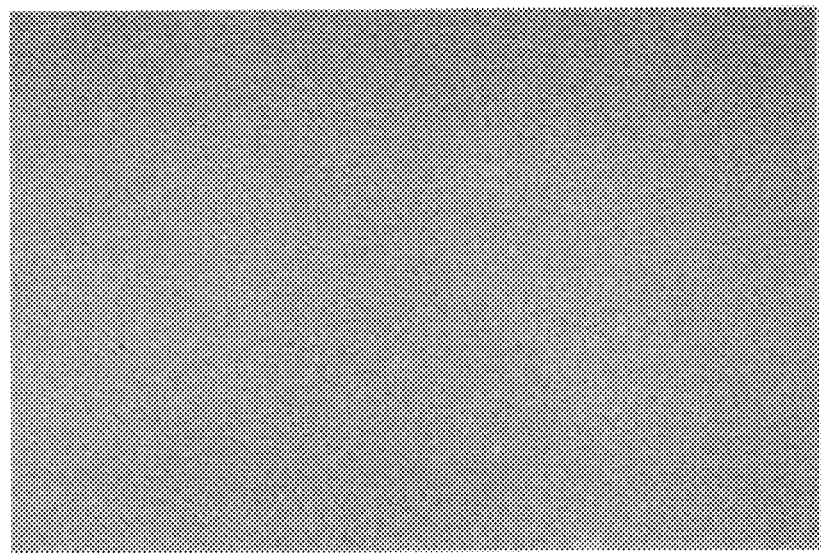
FIG. 16b is a SEM-BEI of a Target B fabricated using the homogenization practice of the invention.

To illustrate the effect of Ta-rich second-phase particles in the target microstructure on the sputter deposited film properties consider the following example: Two targets of a Co-13Cr-4Ta alloy were fabricated. Target A was fabricated using standard techniques and possesses a coarse Ta-rich second-phase microstructural morphology. Target B was fabricated using the new homogenization practice described in the present invention. FIGS. 16a and 16b are SEM-BEI micrographs of Targets A and B, respectively, depicting the morphological difference of the target microstructures.

Sputter process trials were conducted using an Intevac sputtering machine equipped with a CM-Gun cathode. The two targets, A and B, were placed on either side of the sputtering chamber so that they would be used for material deposition on the opposite sides of the same disk. These precautions were taken to ensure that exactly the same sputter conditions and testing conditions were applied for films deposited using the two differently fabricated targets. Furthermore, targets A and B were interchanged in the sputtering chamber to ensure that no anomalies associated with location in the chamber were obscuring the results of the investigation. The results of the analysis revealed that the magnetic films on disks fabricated using target A exhibited coercivities that ranged from 1580 Oersteds to 1780 Oersteds. In contrast, the films on disks sputter deposited with magnetic material using target B exhibited coercivities that ranged between 1920 to 2000 Oersteds. The film Coercivity was ascertained using conventional VSM testing techniques, widely employed in the disk manufacturing industry. There are several noteworthy points resulting from this analysis. First, target A, possessing a chemically inhomogeneous microstructure, resulted in films with a significantly lower Coercivity response than films deposited using target B which possessed a chemically homogeneous microstructure. Second, the actual film coercivities obtained from target A (overall range=200 Oersteds) were much less consistent than the film coercivities obtained from target B (overall range=80 Oersteds). These results demonstrate that if Ta-rich second-phase particles are not minimized in the microstructure of Co-based alloys and if any remnant particles are not adequately mechanically homogenized through the thickness of the target, the resulting Coercivity response of the sputtered film can be diminished and the disk-to-disk Coercivity consistency can be adversely effected.

Figure 17:
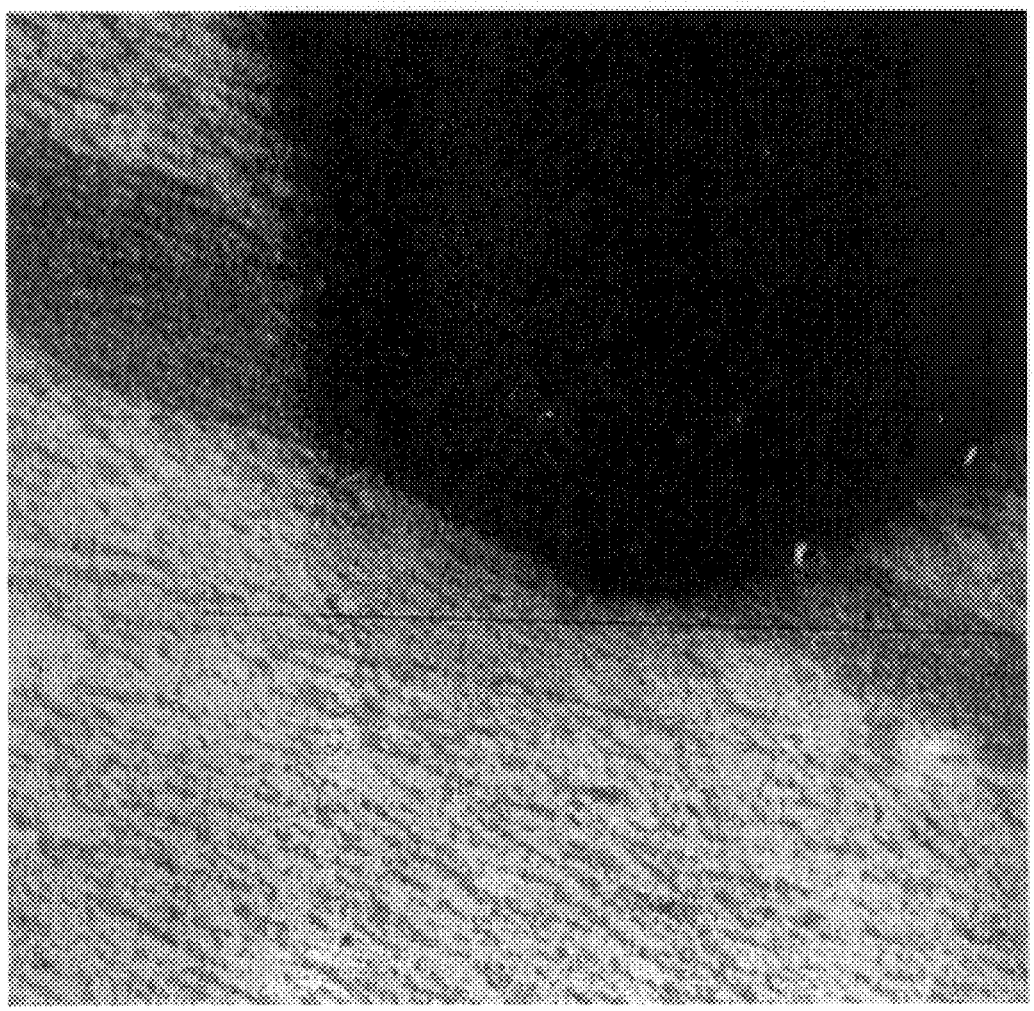
FIG. 17 is a sputter track cross-section of Target A.

FIG. 17 is a cross section of the target A sputter track and reveals preferential second-phase coalescence towards the center of the target. This figure graphically illustrates the type of through thickness microstructural inhomogeneity that occurs in Ta containing Co-based alloys if homogenization practices are not employed.

The invention has been described with reference to certain preferred embodiments. However, as obvious variations thereon will become apparent to those skilled in the art, the invention is not to be considered as limited thereto.

We claim:

1. A magnetic target having a chemically and mechanically uniform microstructure from which data storage devices can be produced which have a coercivity value which is at least 1800 Oersted, said target comprising a matrix of Ta-containing Co-based alloy, wherein Ta-rich secondary phase segregation in the matrix is less than about 15 volume percent, said target being provided by treating the Co-based alloy from which the target is produced by the steps of:

a. annealing and homogenizing the Co-based alloy from which the target is produced by heating at temperatures ranging from 1600° F. to 2600° F. for a period of 10 minutes to 24 hours to dissolve the Ta-rich secondary phase back into solution, prior to hot-rolling or after casting of an as-cast target;

b. hot-rolling said homogenized alloy at temperatures of 1600° to 2600° F. utilizing at least a 3% reduction per pass to produce rolled plates from which said target is produced to insure mechanical and chemical homogenization of the alloy; and c. cooling said rolled plates at a rate equal to or greater than air cooling to retard the formation of a Ta-rich secondary phase.

2. A target according to claim 1, wherein said rolled plates are further soaked at temperatures ranging from 2000° to 2600° F. for periods of 10 minutes to 24 hours, prior to cooling.

3. A target according to claim 1, which comprises from 1 to 12 volume percent of Ta-secondary particulates.

4. A target according to claim 1, wherein cooling in step c. is effected with a cold water quench.

5. A magnetic target according to claim 1, which comprises less than about 2 volume percent of Ta-secondary phase particles.

6. A magnetic target according to claim 1, wherein said targets are made from an alloy of the formula:

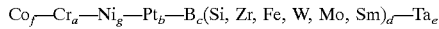

wherein
a=0 to 60 atomic %;
b=0 to 20 atomic %;
c=0 to 15 atomic %;
d=combination of one or more of these elements not to exceed 30 atomic %;
e=0.5 to 6 atomic %;
g=0 to 40 atomic %; and
f=remainder.

7. A magnetic target according to claim 1, wherein said target is made from a Ta-containing alloy selected from the group consisting of:
Co-10 Cr-4 Ta;
Co-14 Cr-6 Ta-8Ni
Co-18 Cr-10 Pt-3Ta;
Co-13 Cr-4 Ta; and
Co-12 Cr-4 Ta-10 Ni.

8. A magnetic target having a chemically and mechanically uniform microstructure, said target comprising a matrix of a Ta-containing Co-based alloy in which alloy Ta-secondary phase segregation in the matrix is less than about 15 volume percent, said target being provided by treating a Co-based alloy from which the target is produced by the steps of:

a. annealing and homogenizing the Co-based alloy from which the target is produced by heating said alloy at temperatures ranging from 1600° F. to 2600° F. for a period of 10 minutes to 24 hours to dissolve the Ta-rich secondary phase back into a solution, prior to hot-rolling or after casting of an as-cast target;

b. hot-rolling said homogenized alloy at temperatures of 1600° to 2600° F. utilizing at least a 3% reduction per pass to produce rolled plates from which said target is produced to insure mechanical and chemical homogenization of the alloy;

c. further heating and soaking the rolled plates at temperatures ranging from 2000° to 2600° F. for periods of 10 minutes to 24 hours; and d. cooling said rolled plates at a rate equal to or greater than air cooling to retard the formation of a Ta-rich secondary phase.

9. A target according to claim 8, wherein reduction per pass is defined as $(1-T_o/T_i) \times 100\%$ where $T_i$ is the thickness of the ingot/plate input into the rolling mill and $T_o$ is the thickness after rolling by one pass.

10. A target according to claim 8, wherein cooling in step (c) is carried out as a cold water quench.

11. A magnetic target according to claim 8, which comprises less than about 2 volume percent of Ta-secondary phase particles.

12. A magnetic target according to claim 8, wherein said magnetic target is formed from an alloy of the formula;

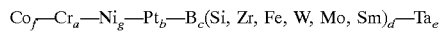

wherein
a=0 to 60 atomic %;
b=0 to 20 atomic %;
c=0 to 15 atomic %;
d=combination of one or more of these elements not to exceed 30 atomic %;
e=0.5 to 6 atomic %;
g=0 to 40 atomic %; and
f=remainder.

13. A magnetic target according to claim 1, wherein said Ta-containing alloy is selected from the group consisting of:
Co-10 Cr-4 Ta;
Co-14 Cr-6 Ta-8Ni Co-18 Cr-10 Pt-3Ta;
Co-13 Cr-4 Ta; and
Co-12 Cr-4 Ta-10Ni.

14. A magnetic target having a chemically and mechanically uniform microstructure from which data storage devices can be produced and formed from an alloy comprising a matrix of Ta-containing Co-based alloy, in which alloy Ta secondary phase segregation is less than about 15 volume percent, said target being produced by treating the Co-based alloy from which the target is produced by the steps of a) heating the alloy at temperatures ranging from about 2200° F. to 2600° F. for a period of about 10 minutes to 24 hours to anneal and homogenize the alloy and to minimize the presence of said Ta secondary phase segregation in the matrix of the alloy; b) hot-rolling the alloy at temperatures of about 2200° to 2600° F. to achieve at least a 3% reduction per pass to produce rolled plates from which said target is produced to insure mechanical and chemical homogenization of the alloy; and wherein data storage devices produced from said target have a Coercivity value which is at least 1800 Oersted.

15. A target according to claim 14, wherein said alloy is further soaked at temperatures ranging from 2000° to 2600° F. for periods of 10 minutes to 24 hours.

16. A magnetic target according to claim 14, which comprises from 1 to 12 volume percent of Ta-secondary phase particulates.

17. A magnetic target according to claim 14, which comprises less than about 2 volume percent of Ta-secondary phase particles.

18. A magnetic target according to claim 14, wherein said magnet target is formed from an alloy of the formula:

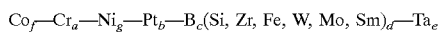

wherein
- a=10 to 60 atomic %;
- b=0 to 20 atomic %;
- c=0 to 15 atomic %;
- d=combination of one or more of these elements not to exceed 30 atomic %;
- e=0.5 to 6 atomic %;
- g=0 to 40 atomic %; and
- f=remainder.

19. A magnetic target according to claim 14, wherein said Ta-containing alloy is selected from the group consisting of:
Co-10 Cr-4 Ta;
Co-14 Cr-6 Ta-8Ni
Co-18 Cr-10 Pt-3Ta;
Co-13 Cr-4 Ta; and
Co-12 Cr-4 Ta-10 Ni.

* * * * *